United States Patent Office 3,644,526
Patented Feb. 22, 1972

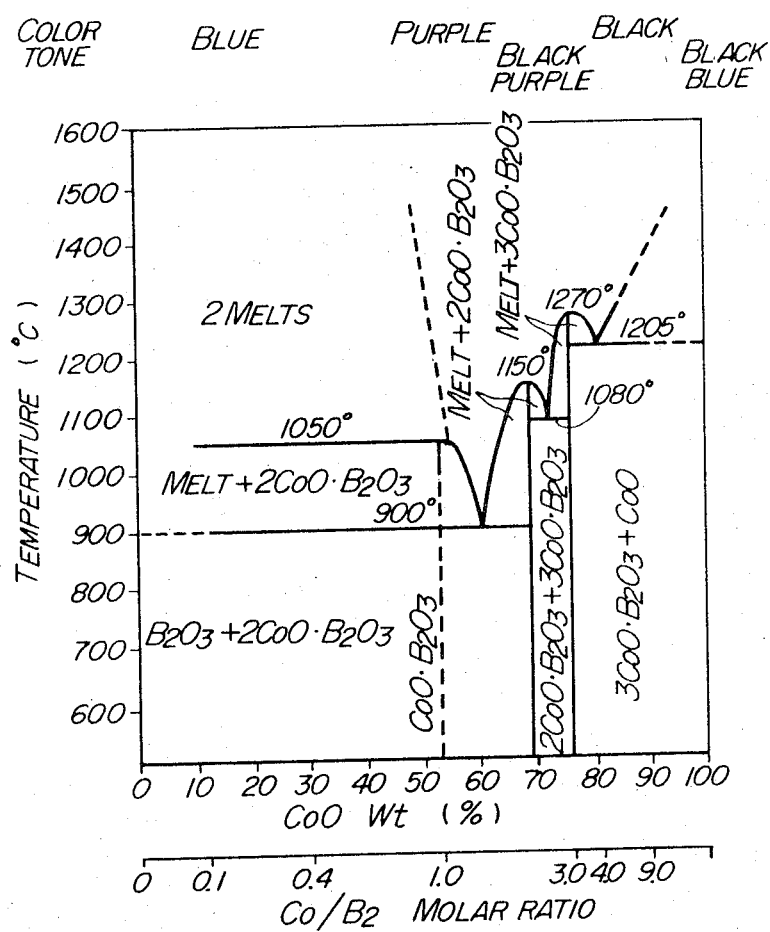

3,644,526
OXIDATION OF CYCLOHEXANE
Kazumi Takagi and Takaharu Ishida, Niihama-shi, Japan, assignors to Sumitomo Chemical Company, Ltd., Osaka, Japan
Filed Feb. 26, 1969, Ser. No. 802,352
Claims priority, application Japan, Mar. 6, 1968, 43/14,829; Oct. 23, 1968, 43/77,604
Int. Cl. C07c *35/08, 45/02*
U.S. Cl. 260—586 B                           2 Claims

ABSTRACT OF THE DISCLOSURE

Cyclohexane is oxidized in a liquid phase in the presence of such a heterogeneous catalyst as a manganese or cobalt borate, particularly a cobalt borate having a $Co/B_2$ molar ratio of 0.5 to 4, whereby the excessive oxidation of cyclohexane and the formation of a borate ester of cyclohexanol can be inhibited and cyclohexanone and cyclohexanol can be produced advantageously.

---

This invention relates to the oxidation of cyclohexane. More particularly, the invention pertains to a process in which cyclohexane is oxidized in a liquid phase in the presence of a heterogeneous catalyst to produce cyclohexanol and cyclohexanone.

A process for oxidizing cyclohexane in a liquid phase with oxygen or an oxygen-containing gas by using as a catalyst such a soluble cobalt compound as cobalt naphthenate or cobalt acetate has already been well known. In such a process, the oxidation is effected in a homogeneous phase and the catalyst is maintained in a homogeneous system throughout the reaction. The reaction product obtained according to the above-mentioned process is mostly a 1:1 mixture of cyclohexanol and cyclohexanone. In addition thereto, however, there are also produced by-products advanced in oxidation which are dibasic and lower monobasic acids, such as adipic and succinic acids, and esters of said fatty acids with cyclohexanol. In order to obtain cyclohexanone and cyclohexanol in high yields, therefore, there is left such a problem that the formation of said by-products should be prevented by inhibiting the conversion to a low extent.

On the other hand, liquid phase oxidation processes using heterogeneous catalysts have not thoroughly been examined yet, and processes using acetic acid catalysts and the like have recently been proposed. However, these processes also have various difficult problems.

In order to solve the problems encountered in the aforesaid process using homogeneous system catalysts, there have been proposed processes for the liquid phase oxidation of cyclohexane carried out by using as a catalyst, in place of an organic acid salt of cobalt, boric acid or a mixture of boric acid and an organic acid salt of cobalt (refer to Japanese patent publication Nos. 11,121/62 and 774/63). The catalyst employed in said processes is maintained in a heterogeneous system throughout the reaction, as the catalyst is used in excess amount. The above-mentioned processes aim to inhibit the excessive oxidation of cyclohexane by forming the resulting cyclohexanol into a borate ester soluble in the reaction liquid. According to these processes, however, there are encountered such drawbacks that boric acid is required to be used in an amount more than the stoichiometric amount necessary for the formation of a borate ester of cyclohexanol, and that the steps are complex in that the cyclohexanol should be recovered by hydrolyzing the thus formed borate ester.

An object of the present invention is to provide a novel process for the liquid phase oxidation of cyclohexane in which is used a heterogeneous catalyst.

Another object is to provide a process for the oxidation of cyclohexane in which the excessive oxidation of cyclohexane is inhibited and no complex step is required.

Other objects will be apparent from the following description.

With an aim to accomplish these objects, the present inventors made various studies to find that when a transition metal borate such as cobalt borate or manganese borate is made present in a suspended state in the reaction system, said borate not only acts as an effective catalyst but also displays an effect of preventing excessive oxidation, with the result that the amounts of the aforesaid fatty acids formed can be made smaller than in the case of conventional processes and, at the same time, it becomes possible to overcome the drawbacks encountered in the case where boric acid or a mixture thereof with an organic acid salt of cobalt is used. Based on the above finding, the inventors have established the present invention.

In accordance with the present invention, therefore, there is provided a process for oxidizing cyclohexane in which cyclohexane is oxidized in a liquid phase with molecular oxygen or inert gas-diluted oxygen in the presence of, as a catalyst, a transition metal borate or a cobalt borate having a $Co/B_2$ molar ratio within the range from 0.5 to 4.

In the present process, the oxidation takes place in a heterogeneous phase and the catalyst, which includes such borates as detailed below, is scarcely soluble in the reaction liquid or in cyclohexane and can be simply separated by filtration.

The transition metal borate referred to herein signifies a borate of cobalt, manganese or the like transition metal or a mixture of 2 or more of such borates. This catalyst is difficultly soluble in cyclohexane and in the oxidation reaction liquid, and dissolves to a metal concentration of only about less than 1 p.p.m., so that it is an entirely heterogeneous catalyst. Since the catalyst is high in specific gravity, it can be readily separated according to precipitation method and can be used repeatedly. Further, this catalyst does not form an ester with cyclohexanol, unlike the case of conventional boric acid catalysts. However, if water is present in the reaction system, the catalyst dissolves in the aqueous phase to bring about degradation in catalyst activity and difficulty of recovery. It is therefore desirable that the catalyst be used under conditions where no water is present as far as possible.

Among the transition metal borates, which are the catalysts employed in the present process, particularly preferable are cobalt borates having a $Co/B_2$ molar ratio within the range of 0.5 to 4, such as $3CoO \cdot B_2O_3$, $$2CoO \cdot B_2O_3, \; CoO \cdot B_2O_3, \; CoO \cdot 2B_2O_3 \cdot 10H_2O$$

$3CoO \cdot 2B_2O_3 \cdot 4H_2O$ and $2CoO \cdot B_2O_3 + 0\text{--}1 \; B_2O_3$ (cobalt borate glass). These catalysts are prepared according to a process in which a mixture of a solution of a boric acid compound, such as $H_3BO_3$, $HBO_2$ or a borate of an alkali or alkaline earth metal, with a cobalt salt solution is subjected to precipitation, or according to a process in which a mixture of $H_3BO_3$, $B_2O_3$ or the above-mentioned borate with an organic or inorganic salt of cobalt is subjected to solid phase reaction in air or in an inert gas or is melted or sintered.

The attached drawing shows the equilibrium state in composition of $CoO$-$B_2O_3$ system catalysts. In the drawing, the compositions of the present catalysts are represented by the regions where the $Co/B_2$ molar ratio is within the range of 0.5 to 4. Among the catalysts in said regions, those having a $Co/B_2$ molar ratio of 1 to 3, especially 2 to 3, are particularly preferable. In the case of a borate having a $Co/B_2$ molar ratio of less than 0.5, water of crystallization tends to be isolated during the reaction to liberate boric acid, or free boric acid tends to be incorporated at the time of preparation, with the result that a borate ester of cyclohexanol produced is undesirably formed. Further, a cobalt oxide represented by, for example, the formula $Co_XO_Y$, wherein X is 1 to 3, and Y is 1 to 4, which is frequently migrated into a cobalt borate catalyst, also becomes a cause for the formation of high boilings, as mentioned previously. In order to avoid the formation of high boilings, therefore, it is desirable that the said $Co/B_2$ molar ratio should not be made more than 4. Free boric acid formed during the preparation of catalyst can be removed by washing with water or alcohol. For the omission of such troublesome washing step, however, the catalyst may be synthesized according to the aforesaid melting or sintering process, whereby it can be directly used in the reaction without adoption of any other treatment step than mere pulverization. If necessary, the catalyst according to the present invention may be supported on a carrier.

The oxidation reaction of cyclohexane in the presence of the present catalyst can be effected at a reaction temperature within such a wide range of about 100° to 300° C., preferably 100° to 200° C. The reaction pressure to be adopted may be within such a range that the starting cyclohexane can maintain a liquid phase at the above-mentioned reaction temperature, and is within the range of normal pressure to 100 kg./cm.² (gauge), preferably normal pressure to 20 kg./cm.² (gauge). Under such conventional conditions in this technical field, a sufficient reaction rate can be attained and cyclohexanone and cyclohexanol can be obtained in high yields.

The higher the conversion of oxidation reaction, the more favorable the result. However, if the conversion is made excessively higher, an excessive oxidation takes place, and therefore the adoption of a conversion of 30% or less is preferable. In this connection, the oxidation reaction is carried out under the aforesaid reaction temperature and pressure conditions while injecting an oxidizing gas in a proportion of 1–100 l./hr. per 100 g. of the starting cyclohexane. The oxidizing gas referred to herein includes oxygen and oxygen or air which has been properly diluted with such an inert gas as nitrogen or the like.

The amount of the catalyst to be added is 0.01–20.0 parts (by weight), preferably 0.1–5.0 parts, per 100 parts of the fed cyclohexane (the staying cyclohexane in the case where the reaction is effected in a continuous manner). The grain size of the catalyst may be 300 mesh or less, in general. If the catalyst is ground more finely or is supported on a carrier such as alumina or the like, the amount of the catalyst can further be reduced. Since the catalyst is insoluble in the reaction liquid, the excessive use thereof is not desirable from the standpoint of handling.

The catalyst of the present invention can display its effects also in the case of continuous oxidation. In application, there may be adopted any of a process in which the catalyst is introduced in the form of a suspension into the feed cyclohexane and is then taken out from the reaction mixture, or a process in which the catalyst is suspended or packed in a reactor and only the reaction liquid is introduced into and withdrawn from the reactor.

In the reaction according to the present invention no ester of inorganic acid (borate ester) is formed, and therefore no chemical operation for the hydrolysis thereof is required. Further, the catalyst and the products can be recovered by such separation procedure as filtration or the like.

Thus, in accordance with the present process, cyclohexane can be oxidized to cyclohexanol and cyclohexanone with high selectivity. Moreover, the separation of these products from the catalyst can be easily effected and the catalyst is readily reusable.

The present invention will be illustrated below with reference to examples, but the examples do not limit the scope of the invention.

EXAMPLE 1

A mixture comprising 465 g. of cyclohexane and 4 g. of metaboric acid was fed to a stainless steel autoclave equipped with a stirrer, a gas inlet, a gas outlet, a reflux condenser and a water separator. Into the autoclave was injected air in a proportion of 12 l./hr. through the gas inlet under such conditions as a temperature of 160° C. and a pressure of 9.5 kg./cm.² abs. After 2 hours' reaction, the reaction liquid was cooled and was taken out. Subsequently, the reaction liquid was hydrolyzed by addition of water and was then analyzed to obtain 20.35 g. of cyclohexanol and 8.88 g. of cyclohexanone with a conversion of 6.50%. In addition thereto, a small amount of an excessively oxidized substance had been formed. On the other hand, the reaction liquid was directly subjected to reduced pressure distillation without effecting the hydrolysis, whereby a solid of borate ester was left in the still.

Under the same conditions as above, according to the present invention, about 5 g. of cobalt borate was fed in place of the metaboric acid and air was injected through the gas inlet in a proportion of 25 l./hr. After 1.5 hours' reaction, the reaction liquid was cooled and the catalyst was separated by filtration. Then the filtrate reaction liquid was directly subjected to reduced pressure distillation. Subsequently, the distillate was analyzed to obtain 16.55 g. of cyclohexanol and 17.74 g. of cyclohexanone with a conversion of 7.15%. No solid of borate ester was left in the still.

EXAMPLE 2

A mixture comprising 465 g. of cyclohexane and 10 g. of cobalt carbonate, which is a heterogeneous system inorganic acid salt other than borate, was fed to the same autoclave as in Example 1. Into the autoclave was injected a mixed gas composed of 5 parts by volume of $O_2$ and 95 parts by volume of $N_2$ in a proportion of 75 l./hr. through the gas inlet under such conditions as a temperature of 140° C. and a pressure of 9.5 kg./cm.² abs., but no reaction took place even after 2 hours.

Under the same conditions as above, according to the present invention, 5 g. of cobalt borate was used as a catalyst, whereby the reaction progressed quickly.

EXAMPLE 3

A mixture comprising 465 g. of cyclohexane and 5 g. of cobalt borate was fed to the same autoclave as in Example 1. Into the autoclave was injected a mixed gas composed of 10 parts by volume of $O_2$ and 90 parts by volume of $N_2$ in a proportion of 75 l./hr. through the gas inlet under such conditions as a temperature of 160° C. and a pressure of 9.5 kg./cm.² abs. After 1.5 hours' reaction, the reaction liquid was quenched and the catalyst was separated by filtration. Subsequently, the filtrate was directly subjected to reduced pressure distillation and the distillate was analyzed to obtain 17.83 g. of cyclohexanone and 16.38 g. of cyclohexanol with a conversion of 6.87%.

EXAMPLE 4

Cyclohexane was oxidized in the same manner as in Example 1, except that 5 g. of manganese borate was used as the catalyst and air was injected in a proportion of 25 l./hr. through the gas inlet. After 3.5 hours' reaction, the reaction liquid was cooled and the catalyst was separated by filtration. Subsequently, the filtrate was analyzed to obtain 27.03 g. of cyclohexanone and 25.80 g. of cyclohexanol with a conversion of 11.97%. Even when the filtrate was subjected to reduced pressure distillation no solid of inorganic acid ester was left in the still.

Comparative Example 1

22.3 g. of $2CoCO_3 \cdot 3Co(OH)_2$ was sufficiently homogeneously mixed in a mortar with 98.0 g. of $H_3BO_3$. The mixture was heated in an electric furnace in open air at 450° C. for 3 hours and then at 900° C. for 2 hours. The melt was cooled with air to obtain a bluish white glasslike substance. This substance was pulverized to 100–200 mesh and was used as a catalyst in the subsequent reaction. The said substance contained a large amount of free boric acid anhydride.

A mixture comprising 5.56 moles of cyclohexane and 5 g. of the catalyst synthesized in the above-mentioned manner was fed to the same autoclave as in Example 1 and was oxidized with air for 1.5 hours under such conditions as 160° C. and 9.5 kg./cm.$^2$ abs. The reaction progressed quickly but the reaction rate gradually lowered. The reaction liquid taken out was brown, and a black brown solid had adhered to the reactor wall. The reaction liquid was charged with a small amount of water and was then boiled to obtain 5.07 moles of cyclohexane, 0.290 mole of cyclohexanol, 0.092 mole of cyclohexanone and 8.02 g. of brown high boilings.

Comparative Example 2

88.0 g. of $2CoCO_3 \cdot 3Co(OH)_2$ was sufficiently homogeneously mixed in a mortar with 21.1 g. of $H_3BO_3$. The mixture was heated in an electric furnace in open air at 450° C. for 3 hours and then at 1100° C. for 2 hours. The melt was cooled with air to room temperature to obtain a black substance. This substance contained cobalt oxide. The substance was pulverized and was used as a catalyst in the subsequent reaction. It was confirmed that no free boric acid had migrated in said substance.

A mixture comprising 5.56 moles of cyclohexane and 5 g. of the above-mentioned catalyst was fed to the same reactor as in Example 1 and was oxidized with air for 1.5 hours under such conditions as 140° C. and 9.5 kg./cm.$^2$ abs. The reaction progressed quickly and no such lowering in reaction rate as in Comparative Example 1 was observed. However, when the reactor was cooled with air after the reaction and the reaction liquid was taken out of the reactor, it was recognized that a black brown rubbery substance was present in the reactor in addition to the catalyst. From the reaction liquid were recovered 5.15 moles of cyclohexane, 0.19 mole of cyclohexanol, 0.15 mole of cyclohexanone and 1.31 g. of rubbery high boilings.

EXAMPLE 5

79.5 g. of $2CoCO_3 \cdot 3Co(OH)_2$ was sufficiently homogeneously mixed in a mortar with 31.0 g. of $H_3BO_3$. The mixture was treated in the same manner as in Comparative Example 2 to obtain a reddish purple substance. This substance was pulverized and was used as a catalyst in the subsequent reaction. After confirming that the catalyst contained no free boric acid, the same reaction as in Comparative Example 2 was effected. After the reaction, the catalyst still maintained its purple color and no formation of rubbery substance was observed.

From the reaction liquid were recovered 5.15 moles of cyclohexane, 0.21 mole of cyclohexanol and 0.15 mole of cyclohexanone.

EXAMPLE 6

125.0 g. of $Co(CH_3COC)_2 \cdot 4H_2O$ was sufficiently homogeneously mixed in a mortar with 62 g. of $H_3BO_3$. The mixture was heated in an electric furnace in open air at 450° C. for 3 hours and then at 850° C. for 2 hours. The melt was cooled with air to room temperature to obtain a reddish purple substance in which had been formed $CoO \cdot B_2O_3$. This substance was puverized and was then used as a catalyst in the subsequent reaction. It was confirmed that a slight amount of free boric acid was present in said substance.

A mixture comprising 5.56 moles of cyclohexane and 5 g. of said catalyst was fed to the same reactor as in Example 1 and was oxidized with air for 1.5 hours under such conditions as 160° C. and 9.5 kg./cm.$^2$ abs. After the reaction, the reaction liquid was taken out and the catalyst was separated by filtration. From the filtrate were recovered 5.16 moles of cyclohexane, 0.24 mole of cyclohexanol and 0.12 mole of cyclohexanone. Such high boilings as in Comparative Examples 1 and 2 were scarcely formed.

We claim:
1. A process for oxidizing cyclohexane which comprises subjecting cyclohexane to liquid phase oxidation with molecular oxygen or inert gas-diluted oxygen at a temperature of 100° to 300° C. in the presence of cobalt borate or manganese borate.
2. A process for oxidizing cyclohexane which comprises subjecting cyclohexane to liquid phase oxidation with molecular oxygen or inert gas-diluted oxygen at a temperature of 100° to 300° C. in the presence of a cobalt borate having a $Co/B_2$ molar ratio of 0.5 to 4.

References Cited

UNITED STATES PATENTS 3,154,586 10/1964 Bänder et al. _____ 260—586 B X
3,232,704 2/1966 Helbig _____ 260—586 B X LEON ZITVER, Primary Examiner N. P. MORGENSTERN, Assistant Examiner U.S. Cl. X.R.

252—432; 260—631 B; 23—59